United States Patent [19]

Buhrer

[11] 3,813,660

[45] May 28, 1974

[54] AN RF MAGNETO-RESISTIVE MAGNETIC DOMAIN DETECTOR

[75] Inventor: Carl F. Buhrer, Framingham, Mass.

[73] Assignee: GTE Laboratories Incorporated, Waltham, Mass.

[22] Filed: Dec. 11, 1972

[21] Appl. No.: 314,052

[52] U.S. Cl.340/174 EB, 340/174 CA, 340/174 TF, 340/174 SR

[51] Int. Cl. ........................ G11c 11/14, G11c 19/00

[58] Field of Search. 340/174 EB, 174 CA, 174 TF, 340/174 SR

[56] References Cited

UNITED STATES PATENTS 3,703,712 11/1972 Bobeck et al. ............... 340/174 CA

OTHER PUBLICATIONS

IBM Tech. Disc. Bull. "Magnetic Bubble Sensing" by Bailot et al., Vol. 13, No. 10, 3/71, pp. 3100, 3101, March 1971.

IBM Tech. Disc. Bull., "Bubble Domain Analog-to-Digital Converter" by Chang et al., Vol. 14, No. 7, 12/71, pp. 2218, 2219.

*Primary Examiner*—Stanley M. Urynowicz, Jr.
*Attorney, Agent, or Firm*—Irving M. Kriegsman

[57] ABSTRACT

A cylindrical magnetic domain detector is formed of a pair of series coupled magneto-resistive elements, one of which is disposed in magnetic coupling relationship with a cylindrical magnetic domain memory position, while the other element serves as a reference magneto-resistive element to cancel out interfering noise signals from a rotating domain driving field. The series coupled magneto-resistive elements are connected in a bridge network which is excited by a high frequency RF signal source through a conveniently located transformer. The transformer is formed of a pair of closely spaced conductors printed on a circuit board on which the cylindrical magnetic domain memories are mounted.

8 Claims, 2 Drawing Figures

AN RF MAGNETO-RESISTIVE MAGNETIC DOMAIN DETECTOR

FIELD OF THE INVENTION

This invention relates to magnetic domain memories. More specifically, this invention relates to a detector of cylindrical domains circulated in a magnetic domain memory.

BACKGROUND OF THE INVENTION

Magnetic domain memory devices are well-known as, for example, described in the patents to Shafer U.S. Pat. Nos. 3,493,940 and 3,493,946. In recent years extensive investigations of magnetic domain behavior in single-crystal magnetic oxides have been made. Of particular interest in these investigations has been the behavior of cylindrical magnetic domains, also known as "bubbles". A recent article dealing with cylindrical domains is entitled "Application of Orthoferrites to Domain-Wall Devices" by Andrew H. Bobeck et al. which was published in the IEEE transaction on Magnetics, Vol. Mag-5, No. 3 of September, 1969 at page 544.

As described in this article, cylindrical magnetic domains can be created and moved about within a magnetic crystal platelet by subjecting such material to selectively controlled magnetic fields. The bubbles may be manipulated and moved in discrete steps with the aid of a pattern layer of bars formed of an eaily magnetized and demagnetized material such as permalloy. Bubbles are attracted or repulsed by magnetic poles of the bar pattern with the poles being induced by an inplane rotating magnetic field. The movement of the bubbles under the action of this magnetic field is from one discrete position on a bar to another bar position in correspondence with the rotation of the field.

Various techniques have been suggested and used to detect the bubbles as they are circulated in a magnetic domain memory. One known useful read-out technique makes use of the magneto-resistive effect of a thin-film stripe on the surface of the magnetic ferrite crystal to detect the presence of the radial fringing field surrounding each bubble. The thin-film stripe is commonly a 200 to 500 Angstrom thick stripe of a nickel-iron permalloy which exhibits a resistance change of about one percent in response to the magnetization change caused by the arrival of a bubble. These magneto-resistive thin-film elements are necessarily small so as to be of a comparable size to that of the magnetic cylindrical domain, which typically may be from three to eight microns in diameter.

The resistance sensing current permitted to flow in a magneto-resistive element for bubble detection is limited by the power dissipation of the thin magneto-resistive film which limits this current to a few milliamperes. As a result, the detectable voltage signal produced by a bubble is of the order of a millivolt or less depending upon the excitation current, resistance of the element, and its placement relative to the bubble in the memory.

In a typical magneto-resistive cylindrical domain detector, a bridge network is employed wherein one arm of the bridge consists of a magneto-resistive element located in proximity to a discrete bubble position. The excitation of the bridge is obtained with a direct current. A pulse which signifies the presence of a bubble has a magnitude of less than a millivolt and lasts for several percent of the period of the cycle of rotation of the bubble driving in-plane magnetic field.

A difficulty encountered in the detection process arises by virtue of the noise introduced from the in-plane rotating magnetic field on the leads of the magneto-resistive element. The millivolt bubble pulse if superimposed on the sinusoidal noise from the in-plane rotating magnetic field whose frequency is the same as that of the repetition rate of the bubble pulses. One method which seeks to eliminate the effect of this interference involves a direct current excited bridge network with careful lead placement and filtering to minimize the effects of electromagnetically induced noise. The output of the bridge network is a very small pulse which must be amplified in DC amplifiers capable of highly demanding long-term stabilities, or in AC amplifiers with DC restoration circuitry.

SUMMARY OF THE INVENTION

In a cylindrical domain detector in accordance with the invention, a bridge network is formed wherein one arm of the bridge is composed of a pair of series connected magneto-resistive elements and the other arm is a balancing resistive potentiometer. One magneto-resistive element senses the arrival of a cylindrical domain at a discrete position while the other serves as a reference for cancelling out the magneto-resistive noise effects from the in-plane rotating magnetic field. A coupling transformer is employed to excite the resistive bridge network with a radio frequency source. The frequency of the RF voltage is selected substantially greater than the frequency of the in-plane magnetic field employed to drive the bubbles through the magnetic crystal.

The bridge output is passed through a high-pass filter to further remove any interference effect from the lower frequency inplane rotating magnetic field and, after amplification, is passed into a phase sensitive detection network along with a reference phase signal from the RF excitation source. The phase sensitive detector produces a signal whose amplitude is representative of the amplitude and sense of unbalance of the bridge. The phase detected signal is coupled to a level comparator which produces an output signal when the detected signal exceeds a predetermined value to signify the presence of a bubble. A timing network is employed to enable a bubble signal storing device during a particular portion of the rotational cycle of the in-plane magnetic field.

The RF excitation of the bridge network renders the bubble detection substantially insensitive to interference from the in-plane rotating magnetic field. A convenient transformer coupling is employed on a circuit board on which the bubble sustaining platelets are mounted to excite the bridge network.

It is, therefore, an object of the invention to provide a cylindrical domain detector which is substantially free from interference by the in-plane magnetic drive field of the cylindrical domains.

BRIEF DESCRIPTION OF DRAWINGS

This and other objects of the invention may be understood from the following description of a preferred embodiment described in conjunction with the drawings wherein.

DETAILED DESCRIPTION OF THE EMBODIMENT

Figures 1, 2:
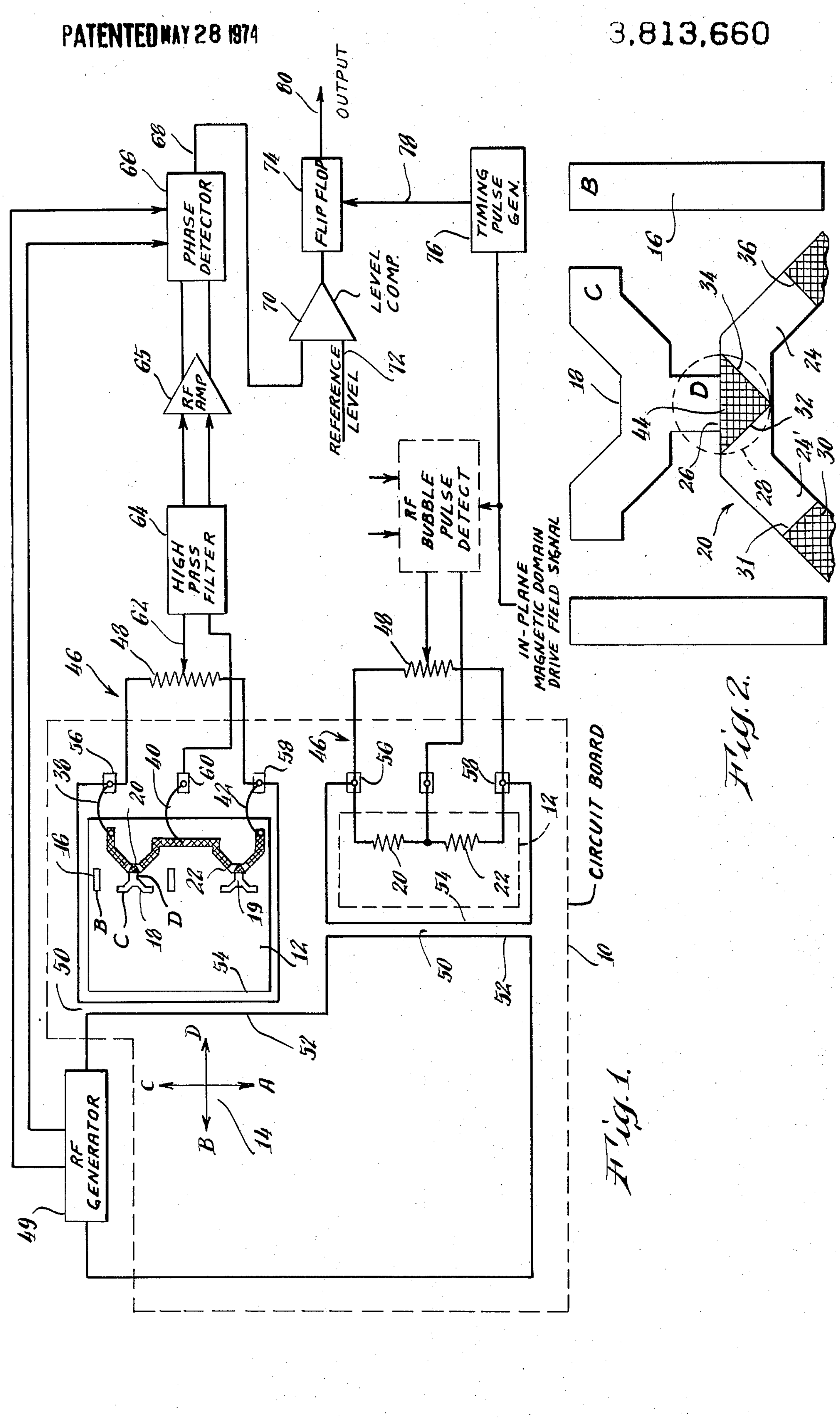
FIG. 1 is a schematic representation of the RF bubble detector in accordance with the invention.
FIG. 2 is an enlarged schematic representation of a magneto-resistive element employed with a cylindrical domain detector in accordance with the invention.

With reference to FIG. 1, a circuit board 10 is shown which supports a plurality of platelets 12 forming magnetic bubble domain memories. The platelets 12 are formed of a suitable ferrite material and are subjected to a bubble sustaining magnetic field (not shown) and a bubble driving magnetic field whose rotation is represented by the various positions of arrows 14. The positions A, B, C and D indicate the direction of rotation of magnetic field 14. The sources and descriptive details for the generation of these magnetic fields are known and reference may be had to the aforementioned Bobeck article for further details.

The bubbles or cylindrical domains are circulated under drive action by the in-plane magnetic field which sequentially moves a bubble to discrete positions along circulating paths as determined by an easily magnetized and de-magnetized bar pattern of permalloy. Thus, for example, a bubble may move in corresponding sequence with the magnetic drive field from position B on bar 16 to positions C and D on Y-bar 18. The permalloy patterns 16, 18 are shown in greatly enlarged proportions in FIG. 2. In practice these patterns are quite small to enable a large quantity to fit on platelet 12.

The platelet 12 is provided with a pair of like magneto-resistive elements 20, 22. The magneto-resistive element 20 is located adjacent to discrete bubble position such as D of Y-bar 18 to sense the arrival of a bubble such as 28 (see FIG. 2) when the in-plane rotating magnetic field has the orientation D. The other magneto-resistive element 22 is associated with a Y-bar 19 and serves as a reference. Element 22 is either oriented just like element 20 relative to field 14 or shifted by 180° from that orientation. If the elements have the same orientation, as shown in FIG. 1, element 22 cannot be along a bubble path to avoid exposing each element to a bubble at the same time. When the elements 22, 20 are oppositely oriented with their Y-bars 18 and 19, they may be both on bubble paths and both can be used to detect cylindrical domains during different phases of the rotating in-plane magnetic field.

The magneto-resistive elements 20, 22 are each etched into place on the surface of the magnetic crystal platelet 12 as a thin-film permalloy segment 24 at the lower end 26 of the Y-bar where a bubble 28 most strongly affects the resistance of the thin-film magneto-resistive segment 24. A gold conductor pattern 30 is placed over the thin-film segment 24 and terminates as shown at lines 31, 32, 34 and 36. The conductor pattern 30 enables the attachment of leads such as 38, 40 and 42 (see FIG. 1) to drive current through elements 20, 22. Note that a small triangular gold pattern section 44 is located directly below bubble position D for enhanced current control and improved bubble sensing.

As shown in FIG. 1, magneto-resistive element 22 has one gold conductor connected to a similar conductor of element 20 to place magneto-resistive elements 20, 22 in series. A bridge network 46 is formed of two arms, one of which is the series connected magneto-resistive elements 20, 22 and the other arm is a potentiometer 48 placed in parallel with series connected elements 20, 22. Bridge network 46 is further connected to an RF excitation current source 49 which is coupled to bridge 46 through an RF transformer 50. RF source 49 produces a signal whose frequency is substantially higher than the frequency of rotation of the in-plane magnetic domain drive field. For example, the frequency of the RF source may be 40 MHz compared to a domain drive frequency of 1MHz.

Transformer 50 has a single loop primary 52 and a single loop secondary 54 directly coupled to junctions 56, 58 and thus across magneto-resistive elements 20, 22 through leads 38 and 42. Transformer 50 is conveniently formed of adjacent current carrying conductors printed on circuit board 10 adjacent to magnetic domain memory platelets 12.

The unbalance output signal of bridge network 46 is taken from a junction 60 between elements 20, 22 and from terminal 62 of potentiometer 48. The bridge output is coupled through a high pass filter 64 to an RF amplifier 65. The amplified bridge output signal is applied to a phase sensitive detector 66 together with a phase reference signal from RF source 49 to provide a signal whose amplitude is representative of the unbalance of bridge 46. This signal is applied on line 68 to a level comparator 70 which delivers an output when the phase signal exceeds a predetermined reference level applied to input line 72.

When the signal on line 68 exceeds the level on line 72, comparator 70 produces an output which is stored in flip-flop 74. The state of flip-flop 74 constitutes the memory output signal 80. Flip-flop 74, however, is only enabled to store a signal from comparator 70 during a particular segment of the rotational cycle of the in-plane magnetic field, e.g. about the time when the phase of the in-plane rotating field 14 is at D. When the in-plane magnetic field is at phase D, an enabling pulse is produced by timing pulse generator 76 on line 78. This enabling pulse lasts for a predetermined time for optiumum detection of a cylindrical domain 28 when it is at the discrete position shown in FIG. 2.

In the operation of the bubble detector, assume that the bridge 46 is balanced and the in-plane rotating magnetic field 14 has delivered a bubble 28 to the position indicated in FIG. 2. The radial magnetic field of the bubble affects the resistance of magneto-resistive element 20 by about one percent. This alters the RF bridge balance sufficiently to produce an output pulse on the output from bridge 46. The output is filtered, amplified and applied to phase sensitive detector 66 so that a bubble signal from comparator 70 is applied to the enabled flip-flop 74.

Having thus described an RF cylindrical domain detector in accordance with the invention, its advantages may be understood. The bubbles are detected with AC coupled circuits to dispense with DC drift sensitive low level amplifiers. A convenient transformer for bridge excitation is provided to detect the bubbles for a large number of bubble domain memories, all of which may be mounted on a common circuit board.

What is claimed is:

1. A detector of magnetic domains being circulated in a crystal of magnetic oxide between discrete positions determined by an overlay permalloy bar pattern, with the domains being moved under drive action from an in-plane magnetic field rotating at a drive frequency comprising a domain sensing magneto-resistive element located on the crystal in proximity to a discrete magnetic domain position to register a change in resistance caused by the magnetic influence of a domain moved onto said discrete domain position;

a reference magneto-resistive element located on the crystal at a place selected to respond in a similar manner to the rotating magnetic field as the domain sensing magneto-resistive element;

a normally balanced resistive bridge network having a pair of circuit arms with balance output junctions, with one circuit arm being formed of the domain sensing and reference magneto-resistive elements in series connection;

means for exciting the bridge network with an RF signal of a frequency which is substantially greater than the drive frequency of the in-plane rotating magnetic field; and RF detecting means for sensing magneto-resistive unbalances of the bridge network caused by a change in the resistance of said domain sensing magneto-resistive element upon the arrival of a magnetic domain at said discrete position;

said exciting means including an RF transformer having a primary winding coupled to the RF signal and a secondary winding, said secondary winding being electrically connected across said circuit arms and formed of a planar signal turn conductor located to surround the crystal to contact said circuit arms, and said primary winding being formed of a single turn conductor passed in proximity to the secondary winding conductor to couple RF energy thereto.

2. The magnetic domain detector as claimed in claim 1 wherein said RF detecting means further includes RF amplifying means including a high pass RF filter having an input coupled to balance output junctions of the bridge network and producing an amplified RF signal representative of the unbalance of the bridge network;

a phase sensitive detector controlled by an RF signal related to a bridge network RF excitation signal and responsive to the RF bridge unbalance signal to produce a detected signal representative of the bridge unbalance;

means responsive to said detected signal for producing an output signal having a magnitude indicative of a magnetic domain induced unbalance of the bridge network at a predetermined timing segment of the rotational cycle of the in-plane magnetic domain driving field.

3. The magnetic domain detector as claimed in claim 2 wherein said output signal producing means further includes means responsive to a signal representative of the frequency of the in-plane rotating magnetic field for producing an output pulse corresponding to a predetermined time period of the cycle of the in-plane rotating magnetic field; and means enabled by said output pulse for storing said output signal to register the sensing of a magnetic domain at said domain sensing magneto-resistive element.

4. In a magnetic domain sensing circuit an isolation transformer for exciting a bridge network used to sense magnetic domains being circulated on a planar platelet of magnetic cylindrical domain sustaining crystal with an in-plane magnetic field rotating at a drive frequency comprising a circuit board sized to support a plurality of platelets for sustaining magnetic domains;

each of said platelets being provided with a pair of series connected magneto-resistive elements forming one arm of a bridge network, at least one of said magneto-resistive elements being located in domain sensing relationship with a discrete magnetic domain position;

an isolation transformer on said circuit board and formed of a primary conductor winding and a plurality of secondary conductor windings;

said secondary conductor windings being each effectively electrically coupled across the series connected magneto-resistive elements of a platelet for electrical excitation of a bridge network;

said primary conductor winding being passed in close proximity to, and in RF coupling relationship with, said secondary conductor windings to enable said bridge network to be excited with an RF signal for sensing of a magneto-resistive element.

5. The magnetic domain sensing circuit as claimed in claim 4 wherein said secondary windings extend substantially around the platelets with the coupling between the primary and secondary conductor windings being selected to enable the bridge network to be excited with a signal whose frequency is substantially greater than the drive frequency of the in-plate rotating magnetic field.

6. The magnetic domain sensing circuit as claimed in claim 5 and further including RF detecting means coupled to said bridge network to produce a signal indicative of the arrival of a magnetic cylindrical domain at said discrete magnetic domain position.

7. The magnetic domain sensing circuit as claimed in claim 6 wherein said RF detecting means further includes a phase sensitive detector effectively coupled to the output of the bridge network and to an RF signal related to the RF excitation signal applied to said bridge network.

8. The magnetic domain sensing circuit as claimed in claim 7 and further including a high pass RF filter coupled between the bridge network and the phase sensitive detector to attenuate interference signals from said in-plane rotating magnetic domain drive field.

* * * * *